US012458870B2

(12) United States Patent
Bonneau et al.

(10) Patent No.: US 12,458,870 B2
(45) Date of Patent: Nov. 4, 2025

(54) METHOD FOR CONTROLLING A GRAPHIC INTERFACE FOR DISPLAYING THE LAUNCHING OF A PROJECTILE IN A VIRTUAL ENVIRONMENT

(71) Applicant: ADVANCED MAGNETIC INTERACTION (AMI), Seyssinet Pariset (FR)

(72) Inventors: Sophie Bonneau, Saint-Martin-d'Hères (FR); Romain Chesney, Saint-Martin-d'Hères (FR); Jean-Marie Dupré la Tour, Saint-Martin-d'Hères (FR); Tristan Hautson, Saint-Martin-d'Hères (FR); Ons Manchoul, Saint-Martin-d'Hères (FR); Simon Thomas, Saint-Martin-d'Hères (FR); Jean-Pierre Traveaux, Saint-Martin-d'Hères (FR)

(73) Assignee: ADVANCED MAGNETIC INTERACTION (AMI), Seyssinet Pariset (FR)

( * ) Notice: Subject to any disclaimer, the term of this patent is extended or adjusted under 35 U.S.C. 154(b) by 963 days.

(21) Appl. No.: 17/628,012

(22) PCT Filed: Jul. 16, 2020

(86) PCT No.: PCT/EP2020/070100
§ 371 (c)(1),
(2) Date: Jan. 18, 2022

(87) PCT Pub. No.: WO2021/013676
PCT Pub. Date: Jan. 28, 2021

(65) Prior Publication Data
US 2022/0258039 A1    Aug. 18, 2022

(30) Foreign Application Priority Data
Jul. 19, 2019   (FR) .................. FR1908213

(51) Int. Cl.
*A63F 13/25* (2014.01)
*A63F 9/02* (2006.01)
(Continued)

(52) U.S. Cl.
CPC .............. *A63F 9/0252* (2013.01); *A63F 9/24* (2013.01); *A63F 13/573* (2014.09); *G06F 3/011* (2013.01)

(58) Field of Classification Search
CPC ........ A63F 9/0252; A63F 9/24; A63F 13/573; G06F 3/011
See application file for complete search history.

(56) References Cited

U.S. PATENT DOCUMENTS 3,724,855 A * 4/1973 Chu ...................... A63F 7/0612
                                                   124/4
4,010,953 A * 3/1977 Russo ................... A63F 7/0612
                                                   124/4
(Continued)

FOREIGN PATENT DOCUMENTS

CN    109671118 A    4/2019
EP      2994813 A1   3/2016
(Continued)

OTHER PUBLICATIONS

International Search Report for International Application No. PCT/EP2020/070100, mailed Sep. 22, 2020, 7 pages with English Translation.
(Continued)

*Primary Examiner* — Steve Rowland
(74) *Attorney, Agent, or Firm* — Bookoff McAndrews, PLLC (57) ABSTRACT

A method for controlling a graphic interface involving images of a digital representation of a launcher, where the launcher including a launching arm equipped with a magnet.
(Continued)

An array of magnetometers $M_i$ measures the magnetic field generated by the magnet, a state vector of the launching arm in a virtual reference frame Rv is determined, and a phase of arming then firing a projectile in the virtual reference frame Rv are identified. An image is then constructed and displayed on the graphic interface.

13 Claims, 4 Drawing Sheets

(51) Int. Cl.
*A63F 9/24* (2006.01)
*A63F 13/573* (2014.01)
*G06F 3/01* (2006.01)

(56) References Cited

U.S. PATENT DOCUMENTS

| | | | |
|---|---|---|---|
| 4,545,766 A * | 10/1985 | Schoessow | G09B 9/00 434/218 |
| 6,102,405 A * | 8/2000 | Spikes | A63F 9/0252 273/351 |
| 6,343,597 B1 * | 2/2002 | Spikes | F41B 3/03 124/16 |
| 6,644,292 B1 * | 11/2003 | Ganson | A63F 9/02 124/16 |
| 9,396,859 B2 | 7/2016 | Jobert et al. | |
| 2013/0303247 A1 | 11/2013 | Wu et al. | |
| 2015/0375128 A1 | 12/2015 | Villar et al. | |
| 2016/0065855 A1 | 3/2016 | Hautson et al. | |
| 2018/0065058 A1 | 3/2018 | Lacrosse et al. | |
| 2019/0224555 A1 * | 7/2019 | Ward | A63B 69/408 |
| 2020/0398139 A1 * | 12/2020 | Harley | A63B 69/38 |

FOREIGN PATENT DOCUMENTS

| | | |
|---|---|---|
| WO | 2014/053526 A2 | 4/2014 |
| WO | 2014/180797 A1 | 11/2014 |
| WO | 2017/141189 A1 | 8/2017 |
| WO | 2018219891 A1 | 12/2018 |

OTHER PUBLICATIONS

International Written Opinion for International Application No. PCT/EP2020/070100, mailed Sep. 22, 2020, 12 pages with English Machine Translation.

* cited by examiner

METHOD FOR CONTROLLING A GRAPHIC INTERFACE FOR DISPLAYING THE LAUNCHING OF A PROJECTILE IN A VIRTUAL ENVIRONMENT

CROSS-REFERENCE TO RELATED APPLICATIONS

This application is a national phase entry under 35 U.S.C. § 371 of International Patent Application PCT/EP2020/070100, filed Jul. 16, 2020, designating the United States of America and published as International Patent Publication WO 2021/013676 A1 on Jan. 28, 2021, which claims the benefit under Article 8 of the Patent Cooperation Treaty to French Patent Application Serial No. FR1908213, filed Jul. 19, 2019.

TECHNICAL FIELD

The disclosure relates to a method and a device for controlling a graphic interface for displaying images of a three-dimensional object, here a launcher, in a predefined virtual environment.

BACKGROUND

There are devices and methods for controlling a graphic interface to display images of a virtual three-dimensional object, for example of a building or of a vehicle, even a town. This virtual three-dimensional object can form a "virtual environment" to be displayed on the graphic interface, in particular when it is a town or a district.

For that, the virtual three-dimensional object is coded in a digital file, and a control method can make it possible to display an image of the virtual three-dimensional object on a graphic interface such as a screen of a computer or an electronic tablet. The digital file then comprises the positions of all the points of the virtual three-dimensional object in a three-dimensional so-called virtual reference frame.

The patent EP2994813 B1 describes an example of a device and a method for controlling a graphic interface to display images of a virtual three-dimensional object. It comprises a pointer equipped with a magnet that can be manipulated by a user in a tracking zone. The locating of the pointer is ensured by a locating device comprising an array of magnetometers. The movement of the pointer in the tracking zone then makes it possible to determine the optical axis of the field of view of the virtual three-dimensional object and a scale coefficient when the pointer approaches or moves away from the virtual three-dimensional object.

However, there is a need for a device and a method for controlling a graphic interface that make it possible to interact dynamically with the virtual environment represented on the images displayed.

BRIEF SUMMARY

The aim of the disclosure is to at least partly remedy the drawbacks of the prior art and, more particularly, to propose a method for controlling a graphic interface that allows a user to interact dynamically with the virtual environment, using a real (that is to say physical, not digital) three-dimensional object that can be manipulated by the user, and more specifically here, to proceed to launch a projectile in the virtual environment on a trajectory defined by the user.

For that, the subject of the disclosure is a method for controlling a graphic interface for displaying images of a digital representation of a three-dimensional object, called launcher, in a virtual environment, the launcher being designed to launch a projectile in a virtual environment, and comprising a structure made of a non-magnetic material with which a launching arm is assembled so as to be mobile and constrained in movement, a magnet being fixed to the launching arm.

The method is implemented by a computation unit, and comprises the following steps:

provision of a locating device for locating the launcher in a tracking zone, comprising: an array of magnetometers fixed to a support surface; the computation unit being connected to the array of magnetometers and to the graphic interface; the tracking zone for tracking the launcher with respect to the array of magnetometers being predefined, and a so-called real three-dimensional reference frame being associated with the tracking zone;

storage in the computation unit: of a digital file coding the virtual environment in a so-called virtual three-dimensional reference frame, the virtual reference frame being associated with the real reference frame by a predefined mapping relationship; and a digital model making it possible to associate, with a state vector $X_{a|r}$ of the magnet representative of the position and of the orientation of the magnet in the real reference frame, a state vector $X_{b,v}$ of the launching arm representative of the position and/or of the orientation of the launching arm in the virtual reference frame, and making it possible to obtain a digital representation of the launcher in the virtual reference frame;

manipulation, by a user, of the launching arm, the launcher being situated in the tracking zone and disposed in contact with the support surface, the launching arm being able to be moved away from a rest position by the user, a return member then exerting a return force on the launching arm toward the rest position;

measurement, by the array of magnetometers, of a magnetic field generated by the magnet at different successive measurement instants $t_n$;

determination of the state vector $X_{a|r}$ of the magnet in the real reference frame, at the measurement instant $t_n$, from the measurements of the magnet field generated by the magnet;

determination of the state vector $X_{b|v}$ of the launching arm in the virtual reference frame, and of the position $P_{p|v}$ of the projectile, from the prestored digital model and from the predetermined state vector $X_{a|r}$, at the measurement instant $t_n$;

identification of an arming phase of the launching arm, as a function of a so-called arming factor K1 defined from the state vector $X_{b|v}$ at the measurement instant $t_n$ and at prior measurement instants, the arming phase being identified when the arming factor K1 is greater than or equal to a predefined threshold value K1s;

when the arming phase is identified, identification of the firing of the projectile as a function of a so-called launching factor K2 defined from the state vector $X_{b|v}$ at the measurement instant $t_n$, the firing of the projectile being identified when the launching factor K2 is greater than or equal to a predefined threshold value K2s;

when the firing of the projectile is identified, determination of the successive positions $P_{p|v}$ of the projectile in the virtual reference frame at subsequent measurement instants;

construction of a two-dimensional image, representing, in the virtual reference frame, the virtual environment, the digital representation of the launcher, and the projectile from the predetermined state vector $X_{b|v}$ of the launching arm and from the predetermined position $P_{p|v}$ of the projectile, then controlling of the graphic interface by the computation unit to display the constructed image.

Some preferred but nonlimiting aspects of this control method are as follows.

The digital model can make it possible also to associate, with the state vector $X_{a|r}$ of the magnet, a state vector $X_{l,v}$ of the launcher representative of the position and of the orientation of the launcher in the virtual reference frame. In which case: during the manipulation step, the user can then also manipulate the launcher; during the step of determination of the state vector $X_{b|v}$ of the launching arm, the state vector $X_{l,v}$ of the launcher can also be determined from the prestored digital model and from the predetermined state vector $X_{a|r}$; during the construction step, the two-dimensional image can then display the digital representation of the launcher from the state vector $X_{l|v}$ of the launcher.

The step of determination of the successive positions $P_{p|v}$ of the projectile can comprise an identification of an intersection between one of the determined successive positions $P_{p|v}$ and a surface of the virtual environment, the intersection being then representative of an impact of the projectile, and determination of a time of flight between the measurement instant at which the firing of the projectile is identified and the measurement instant corresponding to the impact.

During the measurement instants falling within the time of flight, the steps of identification of an arming phase, of identification of the firing of the projectile, and of determination of the successive positions $P_{p|v}$ of the projectile, may not be performed.

The arming factor K1 can be defined from an angle of inclination of the magnet when the launching arm is assembled by pivot link on the structure and/or from a position following an axis orthogonal to the support surface, and/or from a position following a plane parallel to the support surface.

The arming phase can be identified for any so-called current measurement instant $t_n$ subsequent to a reference measurement instant $t_{ref}$ for which the launching arm exhibited an arming factor $K1(t_{ref})$ greater than or equal to the predefined threshold value K1s, the launching arm at the current measurement instant $t_n$ being then away from the rest position.

When the arming phase is identified, an estimated trajectory of the projectile in the virtual reference frame can be determined on the basis of the state vector $X_{l|v}$ of the launcher and from the state vector $X_{b|v}$ of the launching arm, and a digital representation of the estimated trajectory can be displayed on the image constructed in the step of controlling of the graphic interface.

The firing of the projectile can be identified at a measurement instant for which the launching arm reaches its rest position, the arming phase being identified at at least the preceding measurement instant.

The launching factor K2 can be defined from an average speed and/or from an instantaneous speed of the launching arm at at least the measurement instant for which it reaches its rest position.

The state vector $X_{a|r}$ of the magnet can be determined by a Bayesian estimation algorithm or by an optimization method.

The virtual environment can be a three-dimensional space of dimensions greater than those of the tracking zone.

The disclosure relates also to an information storage medium, comprising instructions for the execution of a control method according to any one of the preceding features, when these instructions are executed by an electronic computation unit.

The disclosure relates also to a device for controlling a graphic interface for displaying images of a digital representation of a three-dimensional object, called launcher, in a virtual environment, suitable for implementing the control method according to any one of the preceding features, comprising:
  a launcher comprising a structure made of a non-magnetic material with which a launching arm is assembled so as to be mobile and constrained in displacement, a magnet being fixed to the launching arm;
  a graphic interface;
  a locating device comprising:
    an array of magnetometers fixed to a support surface;
    a computation unit comprising a memory in which is stored a digital file coding the virtual environment in a virtual reference frame, and a digital model of the launcher and of the launching arm, the computation unit being programmed to:
      acquire measurements of the magnetic field generated by the magnet;
      calculate a state vector $X_{a|r}$ of the magnet in a real reference frame associated with a tracking zone defined with respect to the support surface;
      determine a state vector $X_{l|v}$ of the launcher in the virtual reference frame, a state vector $X_{b|v}$ of the launching arm in the virtual reference frame, and the position $P_{p|v}$ of the projectile in the virtual reference frame;
      identification of an arming phase, and, if appropriate, identification of a firing of the projectile and determination of the successive positions $P_{p|v}$ of the projectile in the virtual reference frame at different instants;
      construct a two-dimensional image representing the virtual environment, a digital representation of the launcher and the projectile in the virtual reference frame;
      control the graphic interface to display the constructed image.

BRIEF DESCRIPTION OF THE DRAWINGS

Other aspects, aims, advantages and features of the disclosure will become more apparent on reading the following detailed description of preferred embodiments thereof, given by way of nonlimiting example, and with reference to the attached drawings in which.

DETAILED DESCRIPTION

In the figures and hereinafter in the description, the same references represent identical or similar elements. Furthermore, the different elements are not represented to scale so as to prioritize the clarity of the figures. Moreover, the various embodiments and variants are not mutually exclusive and can be combined with one another. Unless indicated otherwise, the terms "substantially," "approximately," and "of the order of" mean to within 10%, and preferentially to within 5%. Moreover, the terms "lying between . . . and . . ." and equivalents mean that the bounds are included, unless stipulated otherwise.

The disclosure relates to a method for controlling a graphic interface for displaying images of a digital representation of a real three-dimensional object in a virtual environment, and for performing, in the virtual environment, a determined action dynamically by the user using the real three-dimensional object.

According to the disclosure, the real three-dimensional object is an object called launcher designed to launch a projectile in the virtual environment, that is to say a virtual projectile. The launcher comprises a structure and a launching arm mounted to be mobile by displacement on the structure. A magnet is fixed with no degree of freedom to the launching arm. The launcher can be a catapult, a gun, or any other object that can proceed with the launching of a projectile. The launcher is designed to rest in contact with a support surface in order to proceed with the launching of the projectile.

The control method implements the tracking of the magnet by a locating device comprising an array of magnetometers when the launcher is manipulated by a user. The magnet then moves in a tracking zone associated with the array of magnetometers. In other words, the locating device estimates the position and the orientation of the magnet in a real three-dimensional reference frame associated with the tracking zone at the various successive measurement instants.

Figure 1A:
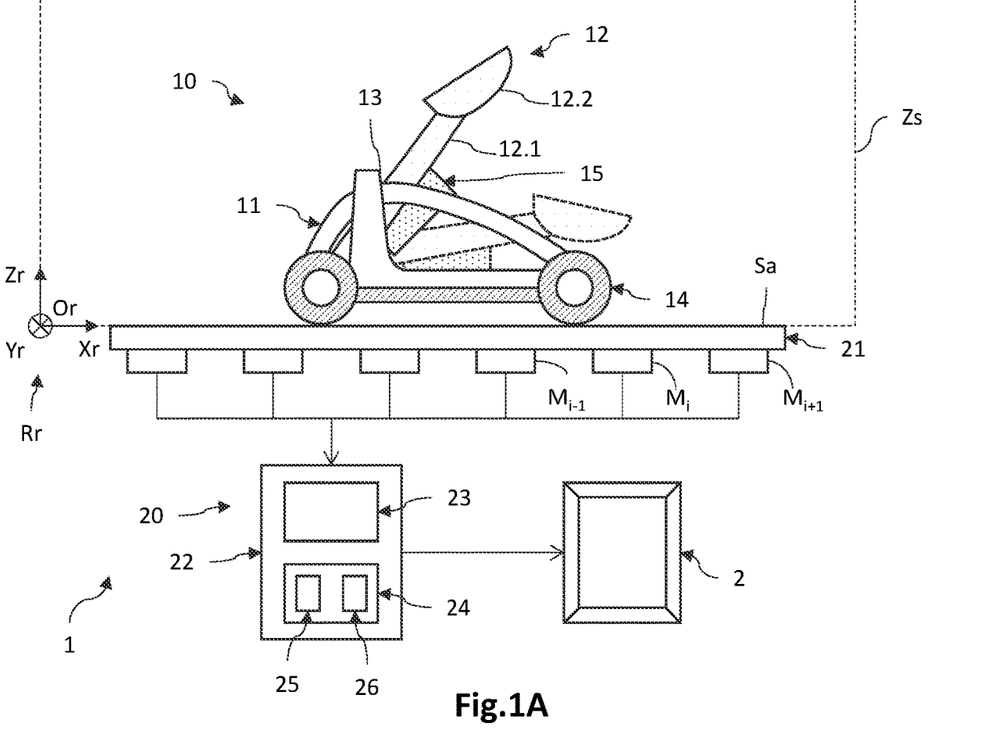
FIGS. 1A and 1B are schematic and partial cross-sectional views of a control device of a graphic interface according to an embodiment.
Figure 1B:
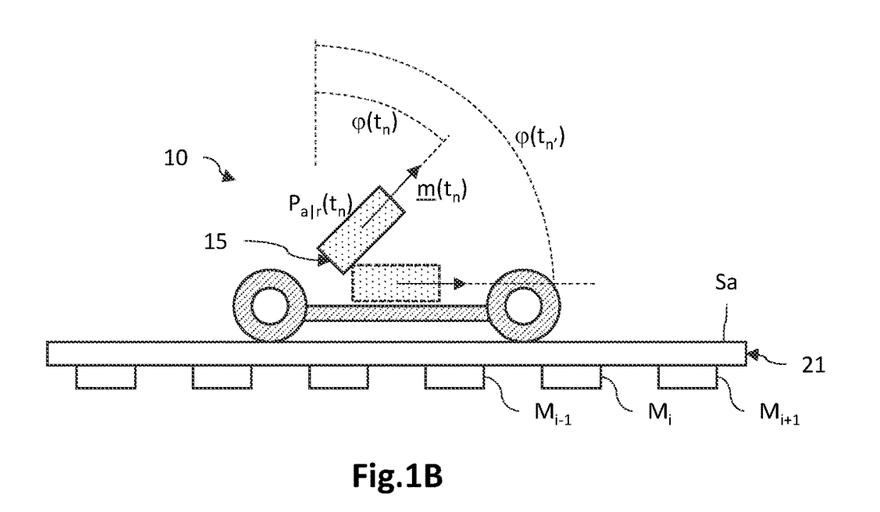

FIGS. 1A and 1B are schematic and partial views of a control device 1 of a graphic interface 2 for displaying images of a digital representation 31 of a launcher 10 and of a projectile 32 in the virtual environment Ev, and performing an action of launching the projectile 32 in the virtual environment Ev using the launcher 10. FIG. 1B is a simplified view of FIG. 1A. The control device 1 comprises a launcher 10 provided with a magnet 15, a locating device 20 for locating the magnet in a real reference frame Rr, and a graphic interface 2.

The launcher 10 is a physical three-dimensional object (i.e., real, not digital) intended to be manipulated by a user, for example by hand, to launch a projectile 32 in a virtual environment Ev. In this example, it is a catapult, but it can be a gun, a slingshot, a crossbow, or any other object that can launch a projectile.

The launcher 10 comprises a rigid structure 11 made of a non-magnetic material, for example plastic, with which a launching arm 12 is assembled so as to be mobile and constrained in movement. The rigid structure 11 here comprises wheels 14 by which it can rest on a support surface Sa of the locating device 20.

The launching arm 12 comprises a longitudinal portion 12.1 and a support portion 12.2 for a projectile 32. The longitudinal portion 12.1 extends along a longitudinal axis between a first end by which it is assembled with the rigid structure 11 and an opposite second end to which the support portion 12.2 is fixed. The launching arm 12 is, here, also made of a non-magnetic material.

The launching arm 12 is assembled in such a way as to be able to move on the rigid structure 11, for example by rotation and/or translation. In this example of a catapult, the launching arm 12 is assembled by a pivot link. Furthermore, it is constrained in movement, and here in rotation, by a return member (not represented). The return member can be a spring, of helical spring or leafspring type. In the case of a gun, the launching arm 12 can move in translation with respect to the rigid structure 11.

At rest, the launching arm 12 occupies an abutment position in which it is held in contact with a stop portion 13 of the rigid structure 11 by the return member. In fact, the return member continuously exerts a return force on the launching arm 12 toward the stop portion 13. When the user actuates the launching arm 12, he or she moves the launching arm 12 more or less away from its abutment position. If the user releases the launching arm 12, the return member returns it with a rapidity commensurate with its distance away from its abutment position. In this example, the launching arm 12 occupies an abutment position (contact with the stop portion 13), but, generally, at rest, it occupies a so-called rest position in which it is not necessarily in contact with a stop portion of the launcher 10, as in the case of a slingshot.

The launcher 10 comprises a magnetic object 15, here a permanent magnet, fixed with no degree of freedom to the launching arm. The magnetic object 15 comprises a material exhibiting a magnetization, for example remanent magnetization, for which a magnetic moment m is defined. It can be a cylindrical permanent magnet, for example annular, as illustrated in the document WO2014/053526, even an electromagnet.

The magnetic material is preferably ferrimagnetic or ferromagnetic. It exhibits a spontaneous non-zero magnetic moment m even in the absence of an external magnetic field. It can exhibit a coercive magnetic field greater than 100 $A \cdot m^{-1}$ or 500 $A \cdot m^{-1}$ and the intensity of the magnetic moment m is preferably greater than 0.01 $A \cdot m^2$, even than 0.1 $A \cdot m^2$, for example equal to approximately 0.8 $A \cdot m^2$. It is considered that the magnetic object can be approximated by a magnetic dipole, but other models can be used. The magnetic axis of the magnetic object is defined as being the axis colinear to the magnetic moment m of the magnetic object.

As FIG. 1B illustrates, when the launching arm 12 occupies the abutment position, the axis of the magnetic moment m of the magnet (also denoted magnetic axis m forms an angle of inclination $\varphi_0$ of rest, this angle being defined by the inclination of the magnetic axis m with respect to a vertical axis, orthogonal to the plane passing through the wheels of the launcher. As an example, the angle of rest $\varphi_0$ can be equal to 45°. The magnetic axis m of the magnet can be parallel or not to the longitudinal axis of the launching arm.

When a user actuates the launching arm 12 and, therefore, moves the latter away from the abutment position, the angle of inclination $\varphi(t)$ becomes greater than the angle of rest $\varphi_0$. This angle of inclination $\varphi(t)$ can vary between the angle of rest $\varphi_0$ and an angle of maximum inclination $\varphi_{max}$.

The locating device 20 is designed to locate the magnet 15 in a so-called real three-dimensional reference frame Rr, and more specifically in a tracking zone Zs associated with an array of magnetometers $M_i$.

Locating is understood to mean determining the position and the orientation of the magnet 15 in the tracking zone Zs. The position $P_{a|r}$ of the magnet 15 corresponds to the coordinates of the geometric center of the magnet, that is to say the unweighted barycenter of all of the points of the magnet. Moreover, the magnetic moment m of the magnet 15 is a vector whose components are $(m_x, m_y, m_z)$ in the real reference frame Rr. Its norm, also called intensity or amplitude, is denoted 1 ml or m.

The real three-dimensional reference frame Rr, here direct, (Or, Xr, Yr, Zr), is defined here and for the rest of the description with the axes Xr and Yr forming a plane parallel to a support surface Sa of the locating device 20, and with the axis Zr oriented substantially orthogonally to the support surface and opposite the magnetometers. Hereinafter in the description, the terms "vertical" and "vertically" are understood to relate to an orientation substantially parallel to the axis Zr, and the terms "horizontal" and "horizontally" as relating to an orientation substantially parallel to the plane (Xr, Yr). Moreover, the terms "lower" and "upper" are understood to relate to a progressive positioning when moving away from the support surface Sa in the direction +Zr. In this example, the origin Or is situated at the border of the tracking zone Zs, but it can be situated elsewhere in the tracking zone Zs, for example at the border of the support surface Sa.

The magnet 15 is intended to move in the tracking zone Zs. This is a space in which the signal-to-noise ratio SNR of at least one of the magnetometers of the locating device is greater than or equal to a predefined threshold value. As an example, the tracking zone Zs can be a space in which the signal, that is to say the norm or at least a component of the magnetic field generated by the magnet and measured by the corresponding magnetometer, is greater than or equal to, for example, 20 times the noise. The noise associated with each magnetometer can be equal to approximately 0.3 µT. In this case, the tracking zone Zs corresponds to a zone of the space in which the magnetic field generated by the magnet 15 and measured by at least one of the magnetometers $M_i$ is greater than or equal to approximately 6 µT, which corresponds to a distance de equal to approximately 20 cm along a guiding axis passing through the magnetometer $M_i$ considered. More simply, the tracking zone Zs can be defined as a space in which each point is at a distance less than or equal to a maximum distance $d_{max}$ on the guiding axis passing through the closest magnetometer $M_i$, the latter being, for example, equal to 20 cm, even 10 cm, or even 5 cm.

The locating device 20 is capable of measuring the ambient magnetic field, of which one of the contributions is the magnetic field generated by the magnet 15, at different measurement instants, over a tracking time T, in the real reference frame Rr, and then of estimating the position and the orientation of the magnet 15 on the basis of the measurements of the magnetometers $M_i$.

For that, it comprises an array of magnetometers $M_i$ distributed facing one another so as to form a measurement plane. They are fixed to a support surface Sa with no degree of freedom. The number of magnetometers $M_i$ can be, for example, greater than or equal to 2, preferably greater than or equal to 16, for example equal to 32, notably when they are triaxial magnetometers. The array of magnetometers $M_i$ does however comprise at least three measurement axes that are mutually distant and not parallel pairwise.

The magnetometers $M_i$ are fixed to the support surface Sa with no degree of freedom, and can be situated on the rear face of a plate 21 whose front face forms the support surface Sa, the latter being made from a non-magnetic material.

Here, they are aligned in rows and columns, but they can be positioned mutually in a substantially random manner. The positions of the magnetometers $M_i$ are known. For example, they can lie between 1 cm and 10 cm, for example 5 cm.

The magnetometers $M_i$ each have a measurement axis, for example three axes, denoted $x_i, y_i, z_i$. Each magnetometer, therefore, measures the amplitude and the direction of the ambient magnetic field $B_i$ of which a contribution is generated by the magnet. More specifically, each magnetometer $M_i$ measures the norm of the orthogonal projection of the ambient magnetic field $B_i$ on the axes $x_i, y_i, z_i$ of the magnetometer. A calibration parameter of the magnetometers $M_i$ can be the noise associated with the magnetometers, here of the order of 0.3 to 0.4 µT. Ambient magnetic field B is understood to be the magnetic field undisturbed by any magnetic element, formed notably by a terrestrial contribution $B^{terr}$ of the order of 50 µT, to which is added the magnetic field $B^a$ generated by the magnet. Other magnetic contributions can be added, such as the contribution associated with the noise of the sensors and the contribution linked to an offset error, which are disregarded here.

The locating device 20 further comprises an electronic computation unit 22 capable of determining the position and the orientation of the magnet 15 in the real reference frame Rr defining a state vector denoted $X_{a|r}$, from the measurements of the magnetometers $M_i$. Furthermore, as described later, the computation unit 22 is capable of determining a state vector $X_{l|v}$ associated with the launcher 10 in a virtual three-dimensional reference frame Rv, a state vector $X_{b|v}$ associated with the launching arm 12 in the virtual reference frame Rv, and a position $P_{p|v}$ of a projectile 32 in the virtual reference frame Rv. The computation unit 22 is also designed to identify an arming phase A of the launching arm 12, and the firing of the projectile 32 and its trajectory $T_{p|v}$ in the virtual reference frame Rv. It is lastly designed to construct an image to be displayed, and to control the graphic interface 2 to display the constructed image.

For that, each magnetometer $M_i$ is electrically connected to the computation unit 22 by an information transmission bus (not represented). The computation unit 22 comprises a programmable processor 23 capable of executing instructions stored on an information storage medium. It further comprises a memory 24 containing the instructions necessary for the implementation of the method for locating the magnet 15 and controlling the graphic interface 2. The memory 24 is also designed to store the information calculated at each measurement instant.

The computation unit 22 implements a mathematical model associating the position of the magnet 15 in the real reference frame Rr, and the orientation and the intensity of its magnetic moment m, with the measurements of the magnetometers $M_i$. This mathematical model is constructed from the equations of electromagnetism, in particular magnetostatics, and is parameterized notably by the positions and orientations of the magnetometers in the real reference frame Rr. Here, this model is nonlinear. The computation unit implements an algorithm for estimating its solution such as, for example, a Bayesian filtering (for example, extended Kalman filter) or an optimization, even any other algorithm of the same type.

Preferably, to be able to approximate the magnet 15 to a magnetic dipole, the distance between the magnet 15 and each magnetometer $M_i$ is greater than 2, even 3 times the greatest dimension of the magnet. This dimension can be less than 20 cm, even less than 10 cm, even than 5 cm. The magnet 15 can be modeled by a dipole model, among others, as a function notably of the distance between the magnet and each magnetometer $M_i$ of the array.

Moreover, the computation unit 22 comprises, stored in its memory 24, a digital file 25 coding the virtual environment Ev in the virtual reference frame Rv, and also comprises, stored in its memory 24, a digital model 26 of the launcher 10 notably making it possible to provide a digital representation 31 of the launcher 10 in the virtual reference frame Rv.

Figure 2A:
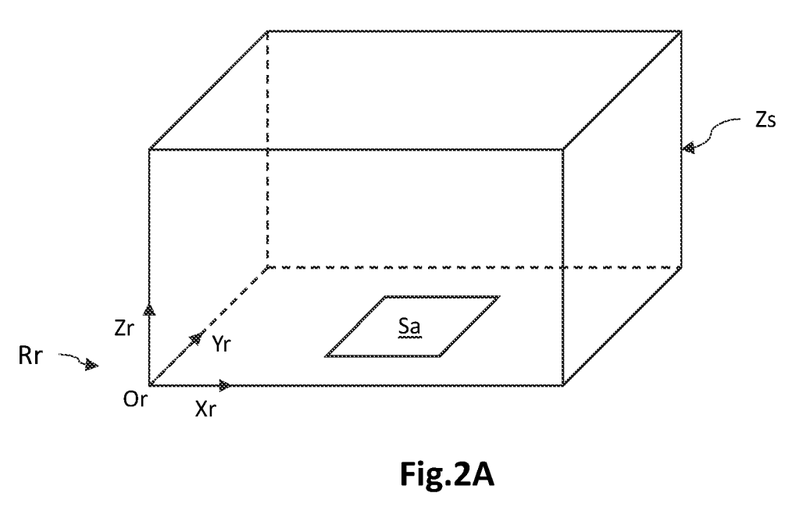
FIGS. 2A and 2B are schematic and partial perspective views of a tracking zone associated with a real three-dimensional reference frame (FIG. 2A) and of a virtual environment associated with a virtual three-dimensional reference frame (FIG. 2B)
Figure 2B:
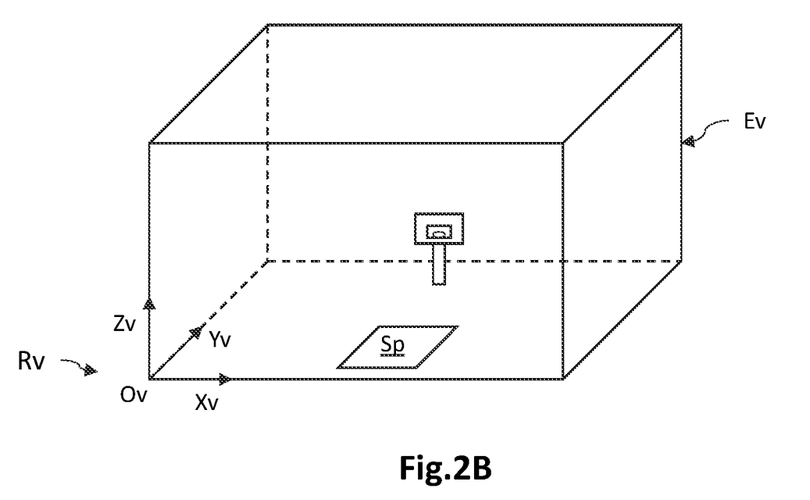

FIGS. 2A and 2B are schematic and partial perspective views of the tracking zone Zs (FIG. 2A) and of the virtual environment Ev (FIG. 2B).

In FIG. 2A, the tracking zone Zs is represented schematically. The support surface Sa is situated in the tracking zone Zs. Each point in the tracking zone Zs has coordinates defined in the real reference frame Rr. In this example, the origin Or of the real reference frame Rr is situated at the border of the tracking zone Zs. The tracking zone Zs is the physical zone of the space in which the SNR is greater than a predefined threshold value, and in which a user can manipulate the launcher 10, for example by hand.

In FIG. 2B, the virtual environment Ev is represented schematically. A positioning surface Sp for a digital representation 31 of the launcher 10 is illustrated, and corresponds to a digital representation of the support surface Sa. The virtual environment Ev can comprise a floor, surfaces, walls, etc. In this example, the virtual environment Ev is a basketball court and comprises a basketball hoop 30.3 disposed between the positioning surface Sp and a back wall 30.2. Each point of the virtual environment has coordinates defined in a so-called virtual, here direct, three-dimensional reference frame Rv (Ov, Xv, Yv, Zv). In this example, the origin Ov of the virtual reference frame Rv is situated at the border of the virtual environment Ev. The virtual environment Ev is coded in a digital file 25 stored in the memory 24 of the computation unit 22. In other words, the digital file 25 provides the position of the points of each of the elements that define the virtual environment Ev. The elements or certain elements of the virtual environment Ev can be static or animated.

Figure 3:
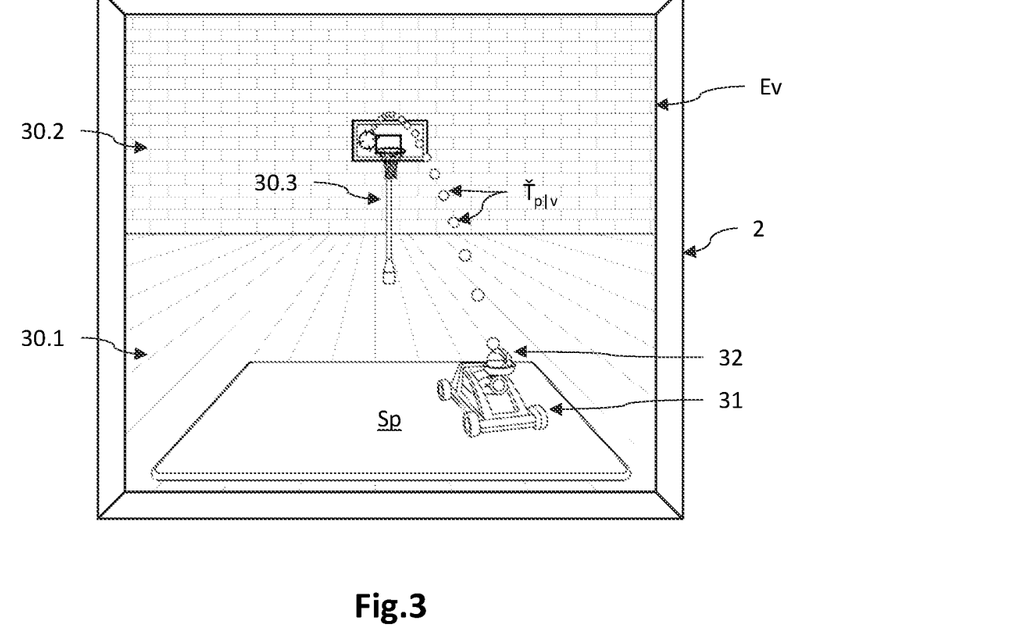
FIG. 3 is a schematic view of a graphic interface displaying, in the virtual environment, a digital representation of a launcher of the control device.

FIG. 3 is a schematic view of a graphic interface 2 displaying a two-dimensional image of the virtual environment Ev in which is situated a digital representation 31 of the launcher 10 and the projectile 32. The virtual environment Ev is, here, a zone of a basketball court and is formed by a floor 30.1, a back wall 30.2 and a basketball hoop 30.3. The positioning zone Sp is illustrated and digital representations 31 of the launcher and of the projectile 32 are displayed in the positioning zone Sp. In this image, the launcher 10 is in an arming configuration A in which the firing of the projectile 32 is possible. An estimated trajectory T of the projectile 32 is displayed.

Moreover, the computation unit 22 incorporates a mapping relationship F between the real reference frame Rr and the virtual reference frame Rv. In other words, each point of the tracking zone in the real reference frame Rr has just one point of the virtual environment Ev in the virtual reference frame Rv associated with it. This mapping relationship F is not necessarily a bijective function, in as much as the virtual environment Ev can be a three-dimensional space larger than that of the tracking zone Zs.

The computation unit 22 also incorporates a digital model 26 of the launcher 10 and of its launching arm 12 making it possible to associate, with a state vector $X_{a|r}$ of the magnet 15 representative of the position and of the orientation of the magnet in the real reference frame Rr:

a state vector $X_{l,v}$ of the launcher 10 representative of the position and of the orientation of the launcher 10 in the virtual reference frame Rv, and a state vector $X_{b,v}$ of the launching arm 12 representative of the position and/or of the orientation of the launching arm 12 in the virtual reference frame Rv.

In other words, knowing the position and the orientation of the magnet 15 in the real reference frame Rr, the computation unit 22 can deduce therefrom the position and the orientation of the launcher 10 in the virtual reference frame Rv, formalized in the state vector $X_{l|v}$. The digital model 26 also comprises information concerning the type of launcher (catapult, gun, etc.) and its dimensions. Thus, the computation unit 22 can construct a digital representation 31 of the launcher 10 in the virtual reference frame Rv.

In addition, knowing the position and the orientation of the magnet 15 in the real reference frame Rr, the computation unit 22 can deduce therefrom the position and/or the orientation of the launching arm 12 in the virtual reference frame Rv, formalized in the state vector $X_{b|v}$. The digital model 26 also comprises information concerning the type of launching arm 12 and its constrained movement with respect to the rigid structure 11 of the launcher 10 (pivot link, runner, etc.; intensity of the return force, etc.) and its dimensions. Thus, the computation unit 22 can construct the digital representation of the launching arm 12 in the virtual reference frame Rv. Note here that the state vector $X_{b|v}$ of the launching arm 12 can be derived from or even included in the state vector $X_{l|v}$ of the launcher 10, in as much as it can be formed by one or more coordinates of the state vector $X_{l|v}$.

Finally, the computation unit 22 can incorporate a digital model of the projectile 32 to be launched in the virtual environment Ev. This digital model can be included in the digital model 26 associated with the launcher 10 and with the launching arm 12. The characteristics of the projectile 32 to be represented in the virtual environment Ev, namely its dimensions and its weight, can thus be defined in the digital model. The computation unit can comprise one or more processors and one or more memories, possibly remote from one another.

Figure 5:
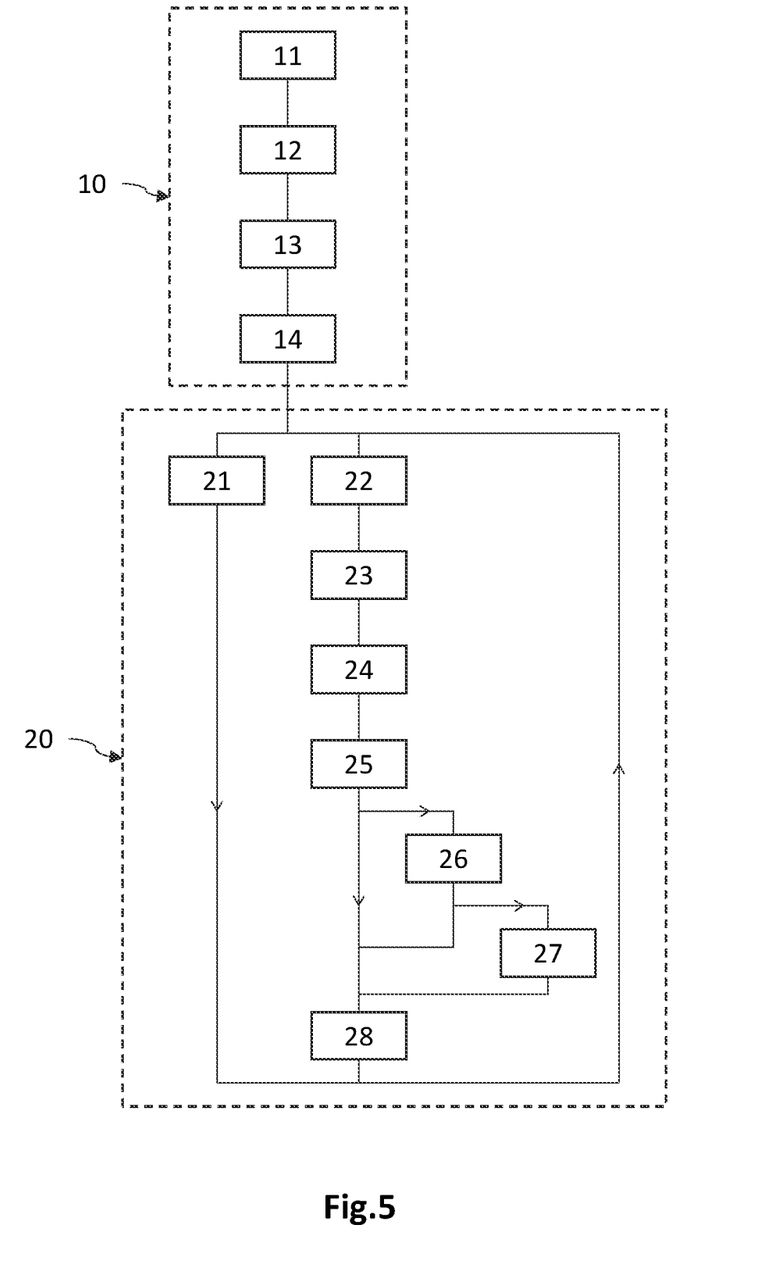
FIG. 5 is a flow diagram illustrating steps of a method for controlling a graphic interface according to an embodiment.

FIG. 5 is a flow diagram of a method for controlling the graphic interface 2 according to an embodiment.

In this example, the virtual environment Ev is formed by a three-dimensional basketball game zone formed by a floor 30.1 comprising a positioning surface Sp in which the digital representation 31 of the launcher 10 is intended to be displayed, a back wall 30.2 and a basketball hoop 30.3 disposed between the positioning surface Sp and the back wall 30.2.

The control method comprises an initialization phase 10.

In a step 11, the digital file coding the virtual environment Ev is stored in the memory 24 of the computation unit 22. Thus, each point of the elements defining the virtual environment Ev (floor, wall, object, etc.) is defined in the virtual reference frame Rv. In this example, the positioning surface Sp, the floor 30.1, the back wall 30.2, and the basketball hoop 30.3 are defined in the virtual reference frame Rv.

In a step 12, the digital model 26 of the launcher 10 and of the launching arm 12 is stored in the memory 24 of the computation unit 22. As mentioned previously, the digital model 26 makes it possible to represent the launcher 10 and its launching arm 12 in the virtual reference frame Rv from the state vector $X_{a|r}$ of the magnet 15. The digital model 26 can also incorporate data relating to the projectile 32 to be represented (dimensions, etc.).

In a step 13, the dimensions of the tracking zone Zs are stored in the memory 24 of the computation unit 22. The mapping relationship F, prestored in the memory 24 of the computation unit 22, makes it possible to ensure the mapping between a position in the real reference frame Rr and a position in the virtual reference frame Rv. In this example, the axes Xr and Xv are chosen parallel to one another, as are Yr and Yv, and the axes Zr and Zv.

In a step 14, the computation unit 22 determines the dimensions of the field of view. The latter can be defined by a first angle in a horizontal plane (Xv, Yv) and a second angle in a vertical plane (Yv, Zv). The orientation of the field of view on an optical axis can be chosen to be constant or can depend on the orientation of the launcher 10 in the virtual reference frame Rv.

The control method then comprises a phase of use 20 of the control device 1 to control the graphic interface 2 and display the images representing the launcher 10 and the launching of the projectile 32 in the virtual environment Ev.

In a step 21, the user places the launcher 10 in the tracking zone Zs and in contact with the support surface. He or she manipulates the launcher 10, that is to say that he or she modifies the position thereof in the horizontal plane (Xr, Yr) and/or its orientation. The launcher 10 does however remain in contact with the support surface Sa.

Initially, the launching arm 12 can occupy its rest position, here the abutment position, that is to say that it is held in contact with the stop portion 13 of the rigid structure 11 by the return member. The angle of inclination $\varphi$ is then equal to the angle of rest $\varphi_0$. The user can modify the position and/or the orientation of the launcher 10 in the tracking zone Zs and observe the digital representation 31 of the launcher 10 in the virtual environment Ev as displayed by the graphic interface.

The user can actuate the launching arm 12 in order to proceed with the launching of a projectile 32 in the virtual environment. For that, he or she moves the launching arm 12 away from the abutment position. The angle of inclination $\varphi$ then increases and becomes greater than or equal to a predefined threshold value $\varphi_1$. The launcher 10 then has in an arming configuration $C_a$ suitable for the launching of the projectile 32. On the other hand, when the angle of inclination $\varphi$ remains between the angle of rest $\varphi_0$ and the threshold value $\varphi_1$, the launcher 10 is considered to have an intermediate configuration $C_i$, which does not lead to the launching of the projectile 32.

Finally, the user can more or less abruptly release the launching arm 12. If the launcher 10 had the intermediate configuration $C_i$ at the instant of release, the launching arm 12 reverts to its abutment position $C_b$ without a firing of the projectile 32 being performed. On the other hand, if the launcher 10 had the arming configuration $C_a$ at the instant of release, the firing of the projectile 32 in the virtual environment Ev is then performed.

Figure 4:
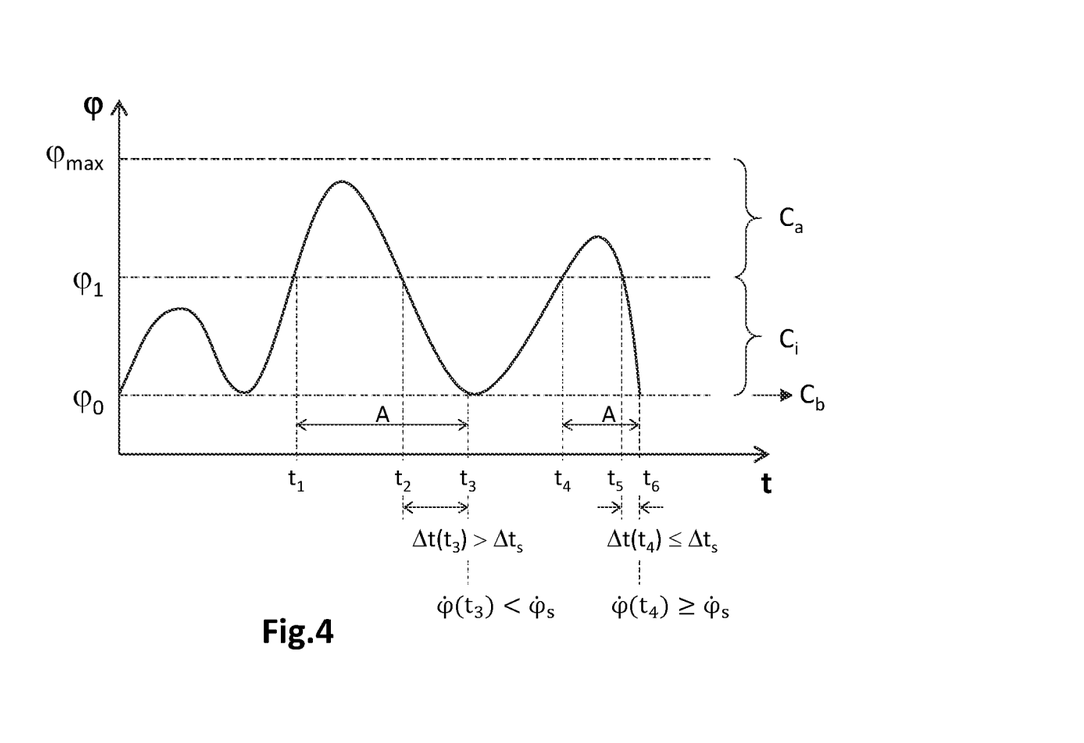
FIG. 4 is an example of the trend over time of the angle of inclination that the magnet fixed to the control arm of the launcher forms when being manipulated by a user.

FIG. 4 illustrates an example of the trend of the angle of inclination $\varphi$ of the magnet 15 as a function of the time.

The angle of inclination $\varphi$ is, here, a first factor K1 representative of the arming of the launching arm 12, this first factor being derived from a state vector $X_{b|v}$ determined by the computation unit 22 on the basis of the measurements of the magnetic field of the magnet 15. This first factor is more specifically representative of the position of the launching arm 12 and, therefore, of the configuration (abutment $C_b$, intermediate $C_i$, arming $C_a$) that the launcher 10 is in at the measurement instant. For other types of launchers, the abutment configuration $C_b$ can be a rest configuration. Obviously, other indications derived from the state vector $X_{b|v}$ can be used as first factor K1 representative of the arming of the launching arm 12. It can thus be a deviation $|\varphi-\varphi_0|$ between the angle of inclination $\varphi$ at the measurement instant and the rest angle $\varphi_0$, even a normalized deviation $|\varphi-\varphi_0|/|\varphi_{max}-\varphi_0|$. It can also be the vertical position of the magnet 15 on the axis Zr or of the launching arm 12 on the axis Zv, or the horizontal position of the magnet 15 in the plane (Xr, Yr) even of the launching arm 12 in the plane (Xv, Yv). The arming factor K1 can be derived from the state vector $X_{b|v}$ of the launching arm 12 or from the state vector $X_{a|r}$ of the magnet 15. It can thus be the angle of inclination of the launching arm 12 in the virtual reference frame Rv or the angle of inclination of the magnet 15 in the real reference frame Rr. These two angles are linked to one another by the fixing of the magnet 15 with no degree of freedom on the launching arm 12 of the launcher 10. In this example, these two angles are considered to be equal.

Initially, the user actuates the launching arm 12, such that the angle of inclination $\varphi(t)$ increases from the rest value $\varphi_0$. It increases to a first maximum of less than $\varphi_1$ such that the launcher 10 remains in the intermediate configuration $C_a$, then reverts to the rest value $\varphi_0$. The launching arm 12, therefore, reverts to its abutment position $C_b$.

Next, the user actuates the launching arm 12 again, such that the angle of inclination $\varphi(t)$ increases to a second maximum greater than the threshold value $\varphi_1$. The launcher 10 then occupies the arming configuration $C_a$ and an arming phase A is then identified; a firing of the projectile 32 is then possible. The arming phase A extends from the instant of transition from the intermediate configuration $C_i$ to the arming configuration $C_a$ and to the instant when the launcher 10 reverts to its abutment configuration $C_b$. In this example, the user passes the launching arm 12 into the arming configuration $C_a$ at the instant $t_1$ ($\varphi(t_1) \geq \varphi_1$) then returns the launching arm 12 to the abutment configuration at the instant $t_3$ ($\varphi(t_3)=\varphi_0$).

The firing of the projectile 32 is then performed or not, as a function of a second factor K2 representative of the launching of the projectile 32, this factor being derived from the state vector $X_{b|v}$ determined by the computation unit on the basis of the measurements of the magnetic field of the magnet 15, or more directly from the state vector $X_{a|r}$ of the magnet 15.

Different factors can be used. According to a first example, the delay $\Delta t(t_3)=t_3 \cdot t_2$ between the instant of transition from the configuration $C_a$ to the configuration $C_1$, here denoted $t_2$, before the instant $t_3$, can be compared. When this delay $\Delta t(t_3)$ is greater than a predefined threshold delay $\Delta t_s$, it is estimated that the firing of the projectile 32 is not performed; the user has, for example, simply returned the launching arm 12 by hand into its rest position, here the abutment position. If, on the other hand, it is less than or equal to the threshold delay $\Delta t_s$, it is estimated that the firing of the projectile 32 is performed; the user has abruptly released the launching arm 12, which has been returned rapidly into its rest position, here of abutment by the return member. More generally, the firing of the projectile 32 is identified when the launching factor K2 is greater than or equal to a predefined threshold value K2s. Also, in this example, the launching factor K2 is $1/\Delta t(t_3)$ and the threshold value K2s is, here, $1/\Delta t_s$.

According to another example, the second launching factor can be the instantaneous angular speed of the launching arm 12 at the instant when it reaches the rest position (here of abutment): $\dot{\varphi}(t_3)$. If this instantaneous angular speed is less than a predefined threshold value $\dot{\varphi}_s$, it is estimated that the firing of the projectile 32 is not performed. If, on the other hand, the instantaneous angular speed is greater than or equal to the threshold value $\dot{\varphi}_s$, it is estimated that the firing of the projectile 32 is performed.

Obviously, other indicators derived from the state vector $X_{b|r}$ or from the state vector $X_{a|r}$ can be used. Thus, it can be the average angular speed calculated at the measurement instant $t_3$ on the basis of a running average over N prior measurement instants, even the maximum value of the angular speed chosen from among the instant $t_3$ and the N prior measurement instants, or even the angular speed at the instant when the acceleration exhibits an inflection point. Here, the second factor is calculated on the basis of the angular speed, but it can be the rectilinear speed based on a variation of the vertical or horizontal position of the launching arm 12.

In the example illustrated in FIG. 4, the launching factor K2, whether it be the delay $1/\Delta t(t_3)$ or the instantaneous angular speed $\dot{\varphi}(t_3)$, indicates that the firing of the projectile 32 is not performed.

Finally, the user actuates the launching arm 12 again, such that the angle of inclination $\varphi(t)$ increases to a third maximum greater than the threshold value $\varphi_1$. The launcher 10 then once again occupies the arming configuration $C_a$ and an arming phase A is then identified from the instant $t_4$; a firing of the projectile 32 is then possible. The user then releases the launching arm 12, which abruptly goes back to its abutment configuration $C_b$ at the instant $t_6$ ($\varphi(t_6)=\varphi_0$).

Here, the launching factor K2 indicates that the firing of the projectile 32 is performed. In fact, the delay $1/\Delta t(t_6)=t_6-t_5$ is greater than or equal to the threshold delay $1/\Delta t_s$. Likewise, the instantaneous angular speed $\dot{\varphi}(t_6)$ is greater than or equal to the threshold speed $\dot{\varphi}_s$. As described later, the computation unit then determines the effective trajectory $T_{p|v}$ of the projectile 32 in the virtual reference frame Rv.

Referring to FIG. 5, the steps performed by the locating device in parallel with the step 21 of manipulation of the launcher 10 in the tracking zone Zs are now described. These steps are performed iteratively at a measurement instant $t_n$, the time being discretized at a determined sampling frequency, for example at 140 Hz. Each iteration of rank n has an associated measurement instant $t_n$, also called current instant.

In a step 22, the magnetometers measure the ambient magnetic field at the current instant, and notably the contribution of the ambient magnetic field generated by the magnet 15, which is fixed to the launching arm 12 of the launcher 10.

Next, in a step 23, the computation unit receives the measurements of the ambient magnetic field, deduces therefrom the contribution of the magnetic field generated by the magnet 15, and determines the state vector $X_{a|r}$ associated with the magnet 15 at the current instant in the real reference frame Rr. The state vector $X_{a|r}$ comprises the position and the orientation of the magnet 15 in the real reference frame Rr. This estimation of the state vector can be performed using an algorithm for estimating the position and the orientation of the magnet 15 of Bayesian type, for example an extended Kalman filter, or using an optimization method (gradient descent, etc.), or using any other algorithm of the same type. An example of estimation of a state vector associated with a magnet 15 is notably described in the application WO2018/219891.

In a step 24, the computation unit determines a state vector $X_{l|v}$ associated with the launcher 10 and a state vector $X_{b|v}$ associated with the launching arm 12, from the state vector $X_{a|r}$ of the magnet 15 and from the stored digital model. The state vector $X_{l|v}$ thus comprises the position and the orientation of the launcher 10 in the virtual reference frame Rv. And, the state vector $X_{b|v}$ comprises the position and/or the orientation of the launching arm 12 in the reference frame Rv, here the angle of inclination $\varphi(t)$ of the magnet 15. Thus, the launcher 10 can be represented digitally with its launching arm 12 in the virtual environment Ev.

In this step, the computation unit also determines the position $P_{p|v}$ of the projectile 32 in the virtual reference frame Rv, from the state vectors $X_{l|v}$ and $X_{b|v}$, and from the digital model of the projectile 32. The projectile 32 can thus be represented digitally in the virtual environment Ev, here resting in the support portion 12.2 of the launching arm 12, whose coordinates in the reference frame Rv are deduced from at least the state vector $X_{b|v}$.

In a step 25, the computation unit determines the first factor K1 representative of the arming of the launching arm 12, this first factor K1 being derived from the state vector $X_{b|v}$ determined by the computation unit on the basis of the state vector $X_{a|r}$. It is, for example, the angle of inclination $\varphi(t_n)$ at the current instant.

The arming phase A is identified when a condition on the arming factor K1 is borne out when the arming factor K1 is greater than or equal to a predefined threshold value K1s, and that here illustrates the fact that the launching arm 12 has been armed but has not yet gone back to the abutment position. In other words, the arming phase A is identified when the current instant $t_n$ is greater than or equal to a reference instant $t_{ref}$ for which the launcher 10 has entered into the arming configuration $C_a$ but for which the launching arm 12 remains away from the abutment position, that is to say, here: $\forall t_n \geq t_{ref}/\varphi(t_n) \geq \varphi_0$ with $\varphi(t_{ref}) \geq \varphi_1$. Here, the arming factor K1 is the angle of inclination $\varphi(t_n)$ and the predefined threshold value is $\varphi_1$.

When the arming phase A is identified, an estimated trajectory $\check{T}_{p|v}$ of the projectile 32 in the virtual reference frame Rv can be determined by the computation unit, on the basis of the position $P_{p|v}$ of the projectile 32, and on the basis of the state vector $X_{b|v}$ of the launching arm 12 (for example, on the basis of the angle of inclination (p at the current instant), and on the basis of the state vector $X_{l|v}$ of the launcher 10 (position and orientation). This estimated trajectory $\check{T}_{p|v}$ can be determined from a known and conventional physical model of ballistic firing, indicating the trajectory of the projectile 32, that is to say its position in the virtual reference frame Rv over time, from the speed vector of the projectile 32 at the abutment position (intensity, orientation), from the coordinates of the abutment position, and from the parameter representative of gravity in the virtual environment Ev.

As illustrated in FIG. 3, the estimated trajectory $\check{T}_{p|v}$ can be illustrated on the image constructed and displayed by the graphic interface, illustrating the assumed trajectory that the projectile 32 can take if the launching arm 12 were released abruptly by the user, and illustrating the point of impact of the projectile 32 on an object of the virtual environment Ev (here the basketball hoop).

In the case where the arming phase A is not identified, the control method continues by going directly to the step 28. On the other hand, in the case where the arming phase A is identified, the control method continues with the step 26.

In a step 26, the computation unit determines the second factor K2 representative of the launching of the projectile 32, this launching factor K2 being derived from the state vector $X_{b|v}$ determined by the computation unit on the basis of the state vector $X_{a|r}$. It is, here, the instantaneous angular speed $\dot{\varphi}(t_n)$ when the launching arm 12 has reached its abutment position.

The firing of the projectile 32 is identified when a condition on the launching factor K2 is borne out, namely when the launching factor K2 is greater than or equal to a predefined threshold value K2s, and, here, when at the current instant where the angle of inclination $\varphi(t_n)$ is equal to the rest angle $\varphi_0$ ($\varphi(t_n)=\varphi_0$), the instantaneous angular speed $\dot\varphi(t_n)$ is greater than or equal to a predefined threshold value $\dot\varphi_s$: $\dot\varphi(t_n) \geq \dot\varphi_s$.

In the case where the firing of the projectile 32 is not identified (i.e., when there is no launching of the projectile 32), the control method continues by going directly to the step 28. On the other hand, in the case where the firing of the projectile 32 is identified, the control method continues with the step 27.

In a step 27, the effective trajectory TW of the projectile 32 in the virtual reference frame Rv is determined by the computation unit 22, on the basis of the position $P_{p|v}$ of the projectile 32 in the abutment position, and on the basis of the state vector $X_{b|v}$ of the launching arm 12 (for example, on the basis of the angle of inclination (p at the current instant), and on the basis of the state vector $X_{l|v}$ of the launcher 10 (position and orientation). It takes into account, for example, the effective speed of the projectile 32 at the abutment position (intensity, orientation), coordinates of the abutment position, and the parameter representative of gravity in the virtual environment Ev.

This effective trajectory $T_{p|v}$ is stored and replaces the previously estimated trajectory $\tilde T_{p|v}$. Also, the computation unit 22 determines the successive positions of the projectile 32 in the virtual reference frame Rv at the different subsequent instants, over a time of flight duration that is also determined.

In a step 28, the computation unit 22 constructs a two-dimensional image of the virtual environment Ev, of the launcher 10 from the state vector $X_{l|v}$, of the launching arm 12 from the state vector $X_{b-v}$, and of the position of the projectile 32 possibly derived from the effective trajectory $T_{p|v}$ determined previously. As described notably in the patent EP2994813 B1 mentioned previously, the image is constructed by taking account of the angles and of the optical axis of the field of view defined previously. The computation unit 22 then controls the display of the constructed image on the graphic interface 2.

The steps 22 to 28 are then reiterated at a defined sampling frequency, which can be constant or not in time. During the measurement instants that follow the firing of the projectile 32 and that fall within the determined time of flight, the steps 26 and 27 are not performed. The position $P_{p|v}$ of the projectile 32 in the virtual reference frame Rv is derived from the predetermined effective trajectory $T_{p|v}$.

Thus, a user can very easily, and particularly intuitively, not only control the display of images on a graphic interface by means of a three-dimensional object (launcher 10) provided with a magnet 15, but also act on the virtual environment Ev represented, here by launching a projectile 32 in this virtual environment Ev. The manipulation of the launcher 10 thus makes it possible to orient and position the projectile 32 in the virtual environment Ev in an intuitive and particularly precise manner.

The control device is particularly simplified in as much as the identification of the firing of the projectile 32 does not entail equipping the launcher 10 in the tracking zone with complex means for analyzing the location of the launcher 10 and the actuation of the launching arm 12. In fact, only one magnet 15 equips the launcher 10, which can then have a simple mechanical structure and be produced in an inexpensive non-magnetic material such as plastic. Nor is the firing of the projectile 32 controlled by the actuation of a button, for example of a keyboard or a mouse, but by the simple releasing of the launching arm 12 by the user, which makes it possible to enhance the user experience.

In addition, the digital representation of the launcher 10 and of the actuation of the launching arm 12 can be fluid and accurate in as much as the measurement frequency can be relatively high, for example can be of the order of 140 Hz. So, each measurement instant, and possibly each image displayed, can be separated from the next instant by just a few milliseconds, which makes it possible to faithfully reproduce the manipulation by the user of the launcher 10 in the tracking zone.

The accuracy is particularly high, notably given that the launcher 10 remains in contact with the support surface in the tracking zone, such that signal-to-noise ratio SNR remains particularly high and the degree of freedom of manipulation of the launcher 10 in the tracking zone is reduced to the two dimensions of the horizontal plane (Xr, Yr) because of the contact on the support surface. The accuracy of the locating of the launcher 10 and of the actuation of the launching arm 12 is then significant.

It is then possible to interact with elements of the virtual environment Ev that are not situated in the digital representation of the tracking zone, this being when the virtual environment Ev is a larger 3D space than that of the tracking zone. This interaction can trigger given actions in the virtual environment (setting in motion or actuation of a virtual object).

Particular embodiments have just been described. Different variants and modifications will become apparent to a person skilled in the art.

Thus, the sampling frequency associated with the locating of the magnet (for example, 140 Hz), the display frequency of the constructed images, and the frequency of updating of the position of the digital representation of the launcher and of the projectile can differ from one another.

Moreover, at the instant when the firing of the projectile is identified, the trajectory $T_{p|v}$ of the projectile is then determined, as described in detail previously. Next, during the time of flight, the position $P_{p|v}$ of the projectile at the current instant is defined from the trajectory determined previously, and possibly from parameters relating to the virtual environment. As an example, during the time of flight, the direction of gravity can be modified, in which case the position $P_{t|v}$ of the projectile is updated accordingly.

As mentioned previously, the abutment position can be a simple rest position in which the launching arm is not in contact with a stop portion. Such is the case notably with a slingshot, even possibly a gun. The steps of identification of the arming and of the firing described previously then take into account the rest position, instead of the abutment position.

The invention claimed is:

1. A method for controlling a graphic interface for displaying images of a digital representation of a three-dimensional object, called launcher, in a virtual environment, the launcher being configured to launch a projectile in a virtual environment, wherein the launcher comprises a structure made of a non-magnetic material with a launching arm that is assembled so as to be mobile and constrained in movement, a magnet being fixed to the launching arm, the method being implemented by a computation unit, comprising the following steps:

providing a locating device for locating the launcher in a tracking zone, comprising:
an array of magnetometers fixed to a support surface, wherein the computation unit is connected to the array of magnetometers and to the graphic interface, and wherein the tracking zone for tracking the launcher with respect to the array of magnetometers is predefined, and a real three-dimensional reference frame is associated with the tracking zone;

in storing, in the computation unit:
a digital file coding the virtual environment in a virtual three-dimensional reference frame, the virtual three-dimensional reference frame being associated with the real three-dimensional reference frame via a predefined mapping relationship;

a digital model making it possible to associate, with a state vector $X_{a|r}$ of the magnet representative of the position and of the orientation of the magnet in the real three-dimensional reference frame, a state vector $X_{b,v}$ of the launching arm representative of the position and/or of the orientation of the launching arm in the virtual three-dimensional reference frame, and making it possible to obtain a digital representation of the launcher in the virtual three-dimensional reference frame;

manipulating, by a user, the launching arm, wherein the launcher is situated in the tracking zone and disposed in contact with the support surface, the launching arm being able to be away from a rest position by the user, a return member then exerting a return force on the launching arm toward the rest position;

measuring, by the array of magnetometers, a magnetic field generated by the magnet at different successive measurement instants $t_n$;

determining the state vector $X_{a|r}$ of the magnet in the real three-dimensional reference frame, at the measurement instant $t_n$, from the measurements of the magnetic field generated by the magnet;

determining, at the measurement instant $t_n$, the state vector $X_{b|v}$ of the launching arm in the virtual three-dimensional reference frame, from the prestored digital model and from the predetermined state vector $X_{a|r}$, and the position $P_{p|v}$ of the projectile from the prestored digital model and from the predetermined state vector $X_{b|v}$;

identifying an arming phase of the launching arm as a function of an arming factor K1 defined from the state vector $X_{b|v}$ at the measurement instant $t_n$ and at prior measurement instants, wherein the arming phase is identified when the arming factor K1 is greater than or equal to a predefined threshold value K1s;

when the arming phase is identified, identifying a firing of the projectile as a function of a launching factor K2 defined from the state vector $X_{b|v}$ at the measurement instant $t_n$, wherein the firing of the projectile is identified when the launching factor K2 is greater than or equal to a predefined threshold value K2s;

when the firing of the projectile is identified, determining the successive positions $P_{p|v}$ of the projectile in the virtual three-dimensional reference frame at subsequent measurement instants;

constructing a two-dimensional image, representing, in the virtual three-dimensional reference frame, the virtual environment, the digital representation of the launcher, and the projectile, from the predetermined state vector $X_{b|v}$ of the launching arm and from the predetermined position $P_{p|v}$ of the projectile, then controlling the graphic interface by the computation unit to display the constructed image.

2. The control method as claimed in claim 1, wherein:
the digital model also makes it possible to associate, with the state vector $X_{a|r}$ of the magnet, a state vector $X_{1,v}$ of the launcher representative of the position and of the orientation of the launcher in the virtual three-dimensional reference frame;

during the manipulating step, the user also manipulates the launcher;

during the step of determining the state vector $X_{b|v}$ of the launching arm, the state vector $X_{1,v}$ of the launcher is also determined from the prestored digital model and from the predetermined state vector $X_{a|r}$;

during the constructing step, the two-dimensional image displays the digital representation of the launcher from the state vector $X_{1|v}$ of the launcher.

3. The control method as claimed in claim 1, wherein the step of determining the successive positions $P_{p|v}$ of the projectile comprises identifying an intersection between one of the determined successive positions $P_{p|v}$ and a surface of the virtual environment representative of an impact of the projectile, and determining a time of flight between the measurement instant at which the firing of the projectile is identified and the measurement instant corresponding to said impact.

4. The control method as claimed in claim 3, wherein, during the measurement instants falling within said time of flight, the steps of identifying an arming phase, identifying the firing of the projectile, and determining the successive positions $P_{p|v}$ of the projectile, are not performed.

5. The control method as claimed in claim 1, wherein the arming factor K1 is defined from an angle of inclination of the magnet when the launching arm is assembled by pivot link on the structure and/or from a position following an axis orthogonal to the support surface, and/or from a position following a plane parallel to the support surface.

6. The control method as claimed in claim 1, wherein the arming phase is identified for any current measurement instant $t_n$ subsequent to a reference measurement instant for which the launching arm exhibited an arming factor K1 ($t_{ref}$) greater than or equal to the predefined threshold value K1s, wherein the launching arm at the current measurement instant $t_n$ is away from the rest position.

7. The control method as claimed in claim 1, wherein, when the arming phase is identified, an estimated trajectory of the projectile in the virtual three-dimensional reference frame Rv is determined on the basis of the state vector $X_{1|v}$ of the launcher and of the state vector $X_{b|v}$ of the launching arm, and a digital representation of the estimated trajectory is displayed on the image constructed in the step of controlling of the graphic interface.

8. The control method as claimed in claim 1, wherein the firing of the projectile is identified at a measurement instant at which the launching arm reaches the rest position, the arming phase being identified at at least the preceding measurement instant.

9. The control method as claimed in claim 1, wherein the launching factor K2 is defined from an average speed and/or from an instantaneous speed of the launching arm at at least the measurement instant for which the launching arm reaches the rest position.

10. The control method as claimed in claim 1, wherein the state vector $X_{a|r}$ of the magnet is determined by a Bayesian estimation algorithm or by an optimization method.

11. The control method as claimed in claim 1, wherein the virtual environment is a three-dimensional space of dimensions greater than those of the tracking zone.

12. A non-transitory information storage medium, comprising instructions for the execution of a control method as claimed in claim 1, when these instructions are executed by an electronic computation unit.

13. A control device of a graphic interface for displaying images of a digital representation of a three-dimensional object called launcher, in a virtual environment, suitable for implementing the control method as claimed in claim 1, comprising:
- a launcher comprising a structure made of a non-magnetic material with which a launching arm is assembled so as to be mobile and constrained in movement, a magnet being fixed to the launching arm;
- a graphic interface;
- a locating device comprising:
- an array of magnetometers fixed to a support surface;
- a computation unit comprising a memory in which is stored a digital file coding the virtual environment in a virtual reference frame, and a digital model of the launcher and of the launching arm, wherein the computation unit is programmed to:
  - acquire measurements of a magnetic field generated by the magnet;
  - calculate a state vector $X_{a|r}$ of the magnet in a real three-dimensional reference frame associated with a tracking zone defined with respect to the support surface;
  - determine a state vector $X_{1|v}$ of the launcher in the virtual reference frame, a state vector $X_{b|v}$ of the launching arm in the virtual reference frame, and the position $P_{p|v}$ of a projectile in the virtual reference frame;
  - identify an arming phase, and, if appropriate, identify a firing of the projectile and determine the successive positions $P_{p|v}$ of the projectile in the virtual reference frame at different instants;
  - construct a two-dimensional image representing the virtual environment, a digital representation of the launcher and the projectile in the virtual reference frame; and
  - control the graphic interface to display the constructed image.

* * * * *